(12) United States Patent
Jo

(10) Patent No.: US 7,414,763 B2
(45) Date of Patent: Aug. 19, 2008

(54) CONTACT IMAGE SENSOR FIXING DEVICE

(75) Inventor: Yong-kon Jo, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1086 days.

(21) Appl. No.: 10/413,406

(22) Filed: Apr. 15, 2003

(65) Prior Publication Data
US 2003/0231360 A1    Dec. 18, 2003

(30) Foreign Application Priority Data
May 31, 2002    (KR) .............................. 2002-30695

(51) Int. Cl.
*H04N 1/04*    (2006.01)
(52) U.S. Cl. .................... 358/498; 358/496; 358/483; 358/474
(58) Field of Classification Search ................. 358/498, 358/496, 483, 474, 471, 482; 250/208.1
See application file for complete search history.

(56) References Cited
U.S. PATENT DOCUMENTS
5,489,995 A * 2/1996  Iso et al. ..................... 358/483
5,805,307 A * 9/1998  Park ........................... 358/471
5,982,512 A * 11/1999 Kim ........................... 358/498

FOREIGN PATENT DOCUMENTS
| JP | 62-68350 | 4/1987 |
|----|----------|--------|
| JP | 2-44463  | 3/1990 |
| JP | 6-189069 | 7/1994 |

OTHER PUBLICATIONS

Japanese Office Action issued Nov. 29, 2005 in Japanese Application No. 2003-128317 filed on May 6, 2003.

* cited by examiner

*Primary Examiner*—Houshang Safaipour
(74) *Attorney, Agent, or Firm*—Staas & Halsey LLP

(57) ABSTRACT

A contact image sensor fixing device for an office machine having a frame, a contact image sensor, and a white roller, the contact image sensor fixing device including an elastic unit mounted on the frame to push the contact image sensor against the whiter roller with a particular pressure, the contact image sensor reading data from a document as the document passes between the contact image sensor and the white roller; a holder unit to accommodate and support the contact image sensor; and at least one holder-movable unit freely moving the holder unit against the elastic force of the elastic unit applied to the contact image sensor to maintain an even pressure between the white roller and the contact image sensor when the contact image sensor receives a rotation force of the white roller.

15 Claims, 3 Drawing Sheets

CONTACT IMAGE SENSOR FIXING DEVICE

CROSS-REFERENCE TO RELATED APPLICATIONS

This application claims the benefit of Korean Application No. 2002-30695, filed May 31, 2002, in the Korean Intellectual Property Office, the disclosure of which is incorporated herein by reference.

BACKGROUND OF THE INVENTION

1. Field of the Invention

The present invention relates to image forming devices such as office machines, including facsimile machines, multi-function machines, and so on, which use a contact image sensor within a scanning device to scan a document, and, more particularly, to a contact image sensor fixing device for an office machine that can maintain a constant contact force between a contact image sensor and a corresponding sensor roller (referred to herein as a "white roller"), to enhance the quality of read out images.

2. Description of the Related Art

In general, an office machine such as a facsimile machine, a multi-function machine, and so on, has a scanning device to scan data recorded on documents, a facsimile device to transfer and receive scanned data through communication lines, and a printing device to print the scanned data, the data received through the communication lines, or data input from a computer on sheets of paper and to output the sheets. The scanner of the office machine is an essential device to transfer data recorded on documents or to print data on sheets of paper.

In FIG. 1, a general scanning device 10 is shown, which is used in an office machine such as a facsimile machine, a multi-function machine, and so on. Such a scanning device 10 has an automatic document transfer part 13 to automatically transfer documents D within the scanning device 10, a scanner 18 for reading out data from each of the documents D transferred by the automatic document transfer part 13, a white roller 19 for pressing each of the documents D against the scanner 18, and a discharge part 21 for discharging each of the documents D that has passed through the scanner 18 and the white roller 19.

The automatic document transfer part 13, which transfers each of the documents D inside the scanning device 10, has a document supply tray 15 in which documents D are loaded, a document load detector 1 for sensing whether the documents D are loaded, a pickup roller 14 for picking up each of the documents D according to operation of the document load detector 1, a friction pad 16 contacting the pickup roller 14 with a predetermined pressure to pick up the documents D sheet-by-sheet by friction, and a supply roller 14' for transferring the documents D to the scanner 18.

The scanner 18 has a contact image sensor 23 (FIG. 2) to read out data from a document D transferred to the white roller 19 by a rotational force of the supply roller 14'.

As shown in FIG. 2 and FIG. 3, the contact image sensor 23 is fixed to a frame 25 of the scanning device by contact image sensor fixing devices 30 and 30'. The frame 25 rotatably supports shafts 20 and 20' of the white roller 19.

The contact image sensor fixing devices 30 and 30' have holders 32 and 32' for accommodating and supporting the contact image sensor 23 and balancing the left and right ends of the contact image sensor 23 to enable smooth data readout operations. Hinge shafts 33 and 33' provided in the respective holders 32 and 32' are accommodated and supported in hinge shaft accommodation holes 34 and 34' formed in the frame 25 so that the holders 32 and 32' can be rotated. Elastic springs 35 and 35' are mounted on respective spring seats 36 and 36' of the frame 25 below the contact image sensor 23 to press the contact image sensor 23 in an upward direction so the scan glass face of the contact image sensor 23 can contact the surface of the white roller 19.

The holders 32 and 32' have respective hook members 41 and 41' coupled with hook member accommodation grooves 42 and 42' formed in the contact image sensor 23 to fix the left and right ends of the contact image sensor 23.

The operations of the conventional scanning device 10 as illustrated in FIGS. 1 through 3 are described below.

First, when the documents D are loaded on the document supply tray 15, the documents D slide down due to the weight thereof, triggering an operation of the document load detector 1. Accordingly, a controller (not shown) applies electric power to a driving motor (not shown) to rotate the pickup roller 14.

The pickup roller 14, in concert with the friction pad 16, picks up one of the documents D by frictional force and transfers the picked-up document D to a document entry detector 17. When a user presses a start button of the office machine to transfer or copy data in the document D, the driving motor is driven again so that the supply roller 14' conveys the document D toward the scanner 18.

Thereafter, as the supply roller 14' conveys the document D between the scanner 18 and the white roller 19, the scanner 18 reads data from the document D. To read the data from the document, the contact image sensor 23 of the scanner 18 emits light through a light emitter (not shown) while contacting the white roller 19. Light is reflected from the document D to an optical sensor (not shown) as the document D is conveyed by the white roller 19. The output of the optical sensor is sent to an image process circuit (not shown).

The image process circuit compares the data output from the contact image sensor 23 with reference data to perform shading corrections and cording and compressing processes with respect to the corrected data, and sends the processed data to a facsimile device or a printing device for transferring or printing the processed data. To output the reference data, the contact image sensor 23 emits light to the white roller 19 through the light emitter before the document D is conveyed to the scanner 18, and the reference data are based upon the reflected light read by the optical sensor.

When the contact image sensor 23 completes the reading of the document data, the document D is externally discharged by the discharge part 21.

Because the scanning device 10 reads out data while the document D is conveyed onto the scanner 18, the contact image sensor 23 must be fixed at an exact position for the data to be read precisely from the document D. That is, the contact image sensor 23 must be positioned parallel to the white roller 19 for the scan glass face of the contact image sensor 23 to linearly contact the curved surface of the white roller 19.

However, for the contact image sensor 23 to contact the white roller 19, the conventional contact image sensor fixing devices 30 and 30' are hingedly rotated by the hinge shafts 33 and 33' of the holders 32 and 32' within the hinge shaft accommodation holes 34 and 34' of the frame 25. This causes a problem in that left and right pressures between the scan glass face of the contact image sensor 23 and the white roller 19 can be uneven due to machining and assembling variables such as the degree of flatness of the scan glass face of the contact image sensor 23 attached the holders 32 and 32', the degree of precision of the positions of the hinge shafts 33 and 33' of the holders 32 and 32', the degree of precision of the hinge shaft accommodation holes 34 and 34' of the frame 25, and so on.

As described above, if uneven left and right pressures are applied between the scan glass face of the contact image sensor 23 and the white roller 19, the contact image sensor 23 and the surface of the white roller 19 do not remain parallel to each other. Thus, the distances between the contact image sensor 23 and the white roller 19 become unequal along the length of the white roller 19, which adversely affects corrections of the document data.

Further, if the uneven left and right pressures are applied between the scan glass face of the contact image sensor 23 and the white roller 19, the document D may become skewed or obliquely conveyed by the white roller 19, resulting in the contact image sensor 23 not reading data precisely from the document D.

SUMMARY OF THE INVENTION

It is an aspect of the present invention to provide a contact image sensor fixing device for office machines that has holder-movable units that freely move holders for a contact image sensor against an elastic force of an elastic unit applied to the contact image sensor to maintain an even contact force between the contact image sensor and a white roller, as well as to maintain a steady readout position.

Additional aspects and advantages of the invention will be set forth in part in the description that follows, and, in part, will be obvious from the description, or may be learned by practice of the invention.

To achieve the above and/or other aspects according to the present invention, there is provided a contact image sensor fixing device for an office machine having a frame, a contact image sensor, and a white roller, the contact image sensor fixing device including an elastic unit mounted on the frame to push the contact image sensor against the white roller with a particular pressure, the contact image sensor reading data from a document as the document passes between the contact image sensor and the white roller; a holder unit to accommodate and support the contact image sensor; and at least one holder-movable unit freely moving the holder unit against the elastic force of the elastic unit applied to the contact image sensor to maintain an even pressure between the white roller and the contact image sensor when the contact image sensor receives a rotation force of the white roller.

The holder-movable unit has a hinge bracket; a movable hinge formed on one end of the hinge bracket and a corresponding portion of the holder unit to movably support the holder unit within a certain range when the holder unit is elastically displaced by the elastic unit; and a fixed hinge formed on another end of the hinge bracket and a corresponding portion of the frame to hingedly attach the other end of the hinge bracket to the frame to enable the holder unit supported by the movable hinge to rotate beyond a moving range of the movable hinge.

The movable hinge has a movable hinge shaft to freely move the holder unit; and a movable hinge shaft accommodation hole supporting the movable hinge shaft within a certain range.

Further, the fixed hinge has a fixed hinge shaft to rotate the hinge bracket; and a fixed hinge shaft accommodation hole supporting the fixed hinge shaft.

The holder unit includes two holders, each holder accommodating an end of the contact image sensor, respectively, and having a corresponding holder-movable unit. Each of the holders has a hook member and each end of the contact image sensor has a hook member accommodation groove, and each of the holders is attached to a respective end of the contact image sensor each hook member accommodation groove receiving a respective hook member.

To achieve the above and/or other aspects according to the present invention, there is provided a machine for scanning a document, including a frame, a white roller, and a scanner adjacent to the white roller. The scanner includes a contact image sensor to read data from the document as the document is conveyed between the contact image sensor and the white roller, and a contact image sensor fixing device to attach the contact image sensor to the machine. The contact image sensor fixing device includes an elastic unit mounted on the frame to push the contact image sensor against the white roller, a holder unit to accommodate and support the contact image sensor, and at least one holder-movable unit providing free movement of the holder unit against an elastic force of the elastic unit that is applied to the contact image sensor, the free movement maintaining an even pressure between the white roller and the contact image sensor when a rotation force of the white roller is applied to the contact image sensor.

To achieve the above and/or other aspects according to the present invention, there is provided a method for scanning a document by a machine having a frame, a white roller, a scanner adjacent to the white roller, the scanner having a contact image sensor and a contact image sensor fixing device, and the contact image sensor fixing device having an elastic unit mounted on the frame, a holder unit, and at least one holder-movable unit, the method including attaching, by the contact image sensor fixing device, the contact image sensor to the machine; pushing, by the elastic unit, the contact image sensor against the white roller; accommodating and supporting the contact image sensor by the holder unit; providing, by the at least one holder-movable unit, free movement of the holder unit against an elastic force of the elastic unit that is applied to the contact image sensor, the free movement maintaining an even pressure between the white roller and the contact image sensor when a rotation force of the white roller is applied to the contact image sensor; conveying the document between the contact image sensor and the white roller; and reading data, by the contact image sensor, from the document as the document is conveyed.

These, together with other aspects and advantages that will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and/or other aspects and advantages of the present invention will become apparent and more readily appreciated from the following description of the embodiments, taken in conjunction with the accompanying drawings, of which.

DETAILED DESCRIPTION OF THE PREFERRED EMBODIMENT

Figure 1:
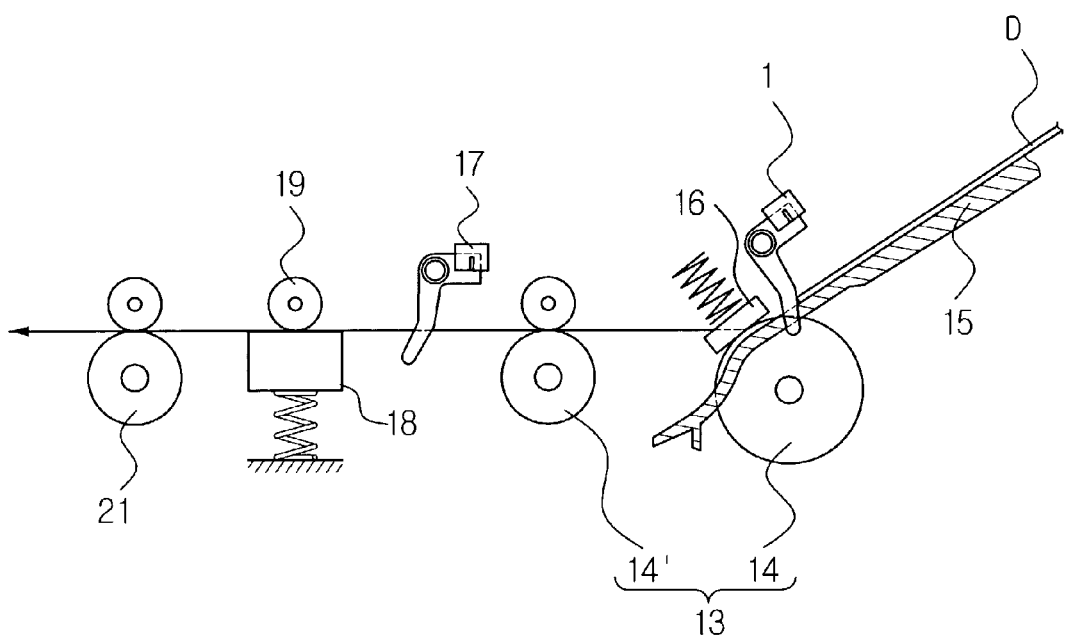
FIG. 1 is a conceptual view showing a conventional scanning device.
Figure 2:
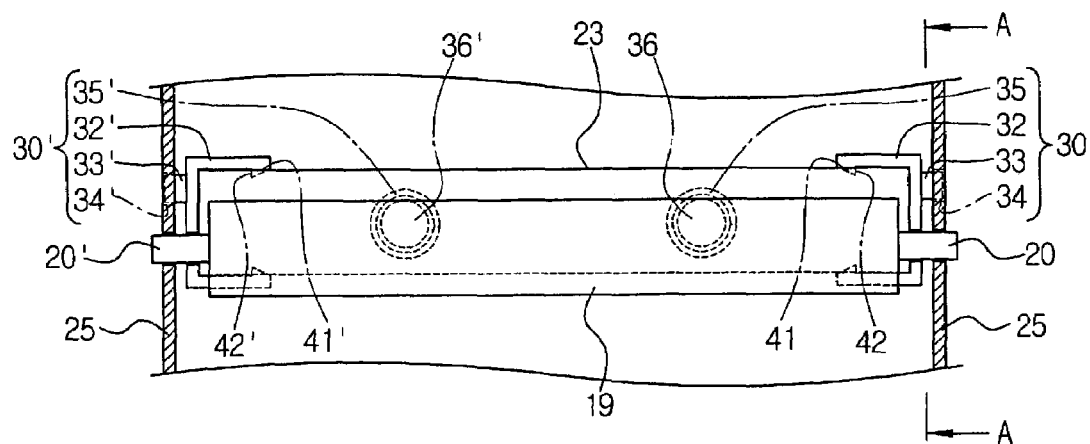
FIG. 2 is a plan view illustrating a contact image sensor that is attached to the scanning device of FIG. 1 using a conventional contact image sensor fixing device.
Figure 3:
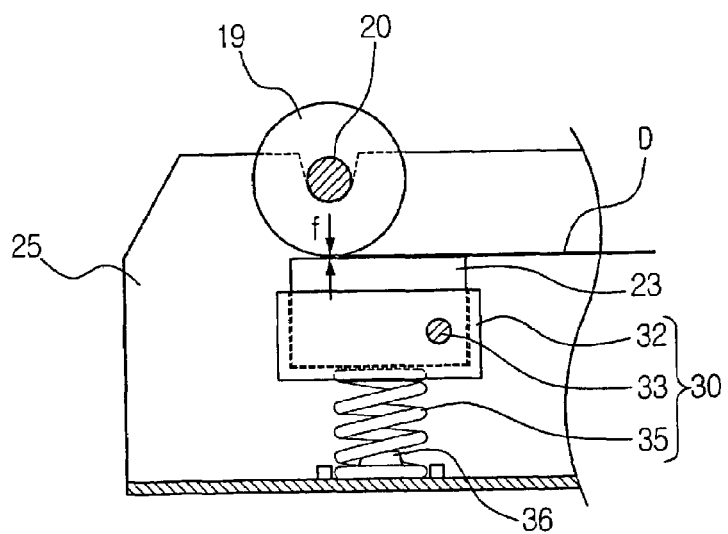
FIG. 3 is a cross-sectional side view of the contact image sensor and the contact image sensor fixing device of FIG. 2, taken along a line A-A of FIG. 2.

Hereinafter, an embodiment of the present invention will be described in detail with reference to the attached drawings, wherein the like reference numerals refer to the like elements throughout. The present invention may, however, be embodied in many different forms and should not be construed as being limited to the embodiments set forth herein; rather, this embodiment is provided so that the present disclosure will be thorough and complete, and will fully convey the concept of the invention to those skilled in the art.

Figure 4:
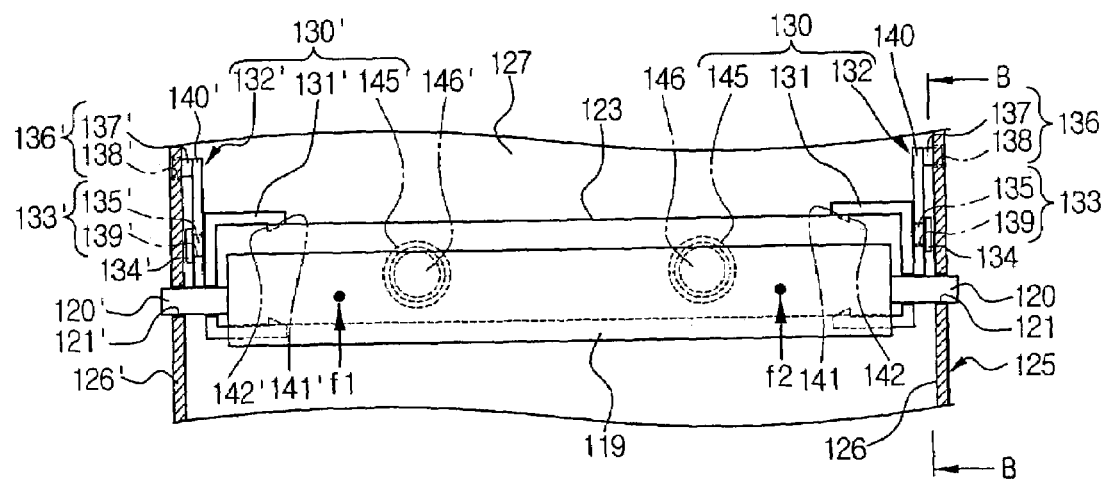
FIG. 4 is a plan view illustrating a contact image sensor that is attached to a scanning device using a contact image sensor fixing device according to an embodiment of the present invention.
Figure 5:
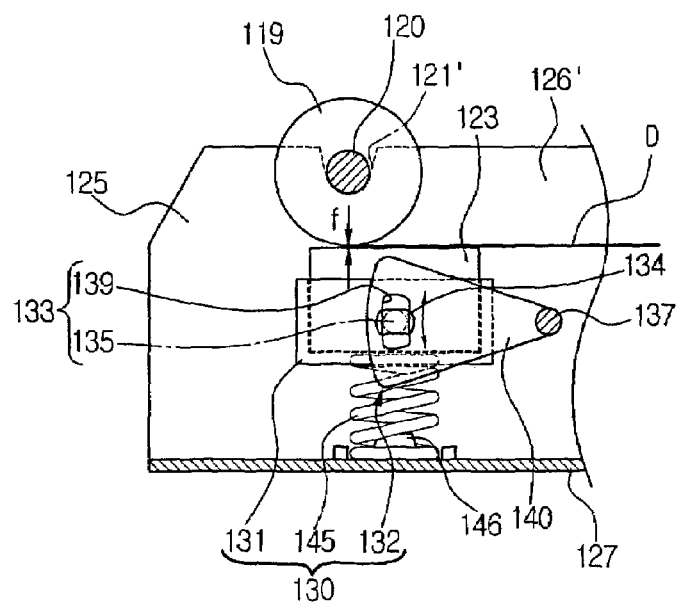
FIG. 5 is a cross-sectional side view of the contact image sensor and the contact image sensor fixing device of FIG. 4, taken along a line B-B of FIG. 4.

In FIG. 4 and FIG. 5, a contact image sensor 123 used to read data from a document D in a scanning device of an office machine, such as a facsimile machine, is attached to the office machine in close proximity to a white roller 119 by contact image sensor fixing devices 130 and 130' according to an embodiment of the present invention.

Each of the contact image sensor fixing devices 130 and 130' includes a flattened U-shaped frame 125, an elastic unit with elastic springs 145 and 145' for elastically pressing the contact image sensor 123 against the white roller 119 with a certain amount of pressure, a holder unit with holders 131 and 131' for accommodating and supporting the contact image sensor 123, which is elastically supported against the frame 125 by the elastic unit, and a hinge unit with holder-movable units 132 and 132' for hingedly attaching the holder unit to the frame 125 so that both ends of the contact image sensor 123 are freely displaced.

The frame 125 has first and second sidewalls 126 and 126' with shaft support openings 121 and 121' rotatably supporting shafts 120 and 120' of the white roller 119, and a bottom member 127 having spring seats 146 and 146' that support the elastic springs 145 and 145' and are spaced apart at predetermined intervals.

The elastic unit includes first and second elastic springs 145 and 145' respectively supported by the spring seats 146 and 146' formed on the bottom member 127 of the frame 125 to elastically press the contact image sensor 123 against the white roller 119.

The holder unit includes first and second holders 131 and 131' that accommodate the left and right ends of the contact image sensor 123. The first and second holders 131 and 131' fix the left and right ends of the contact image sensor 123 by inserting hook members 141 and 141' in corresponding hook member accommodation grooves 142 and 142' formed in the contact image sensor 123.

The hinge unit has first and second holder-movable units 132 and 132' to respectively attach the first and second holders 131 and 131' to the first and second sidewalls 126 and 126' of the frame 125 so that the first and second holders 131 and 131' are displaced within a certain range when the first and second holders 131 and 131' are elastically displaced by the first and second elastic springs 145 and 145'.

The first holder 131 is mounted on one end, for example, on the right end, of the contact sensor 123. The first holder-movable unit 132 for hingedly attaching the first holder 131 to the first sidewall 126 includes a first hinge bracket 140 having a fan shape. A movable hinge 133 is formed in a first end of the first hinge bracket 140 to allow the first end of the first hinge bracket 140 to move in a circular arc and the first holder 131 to move within a certain range when the first holder 131 is elastically displaced by the first elastic spring 145. A fixed hinge 136 is formed in a second end of the first hinge bracket 140 to hingedly fix the second end of the first hinge bracket 140 to the first sidewall 126 of the frame 125. The fixed hinge 136 allows the first holder 131, which is supported by the movable hinge 133, to rotate, as well as move up and down.

The movable hinge 133 includes a movable hinge shaft 135 formed in the first end of the first hinge bracket 140 and a portion of the first holder 131 to allow rotation of the first holder 131, and a movable hinge shaft accommodation hole 139 having a circular arc shape formed in the first end of the first hinge bracket 140 to support the movable hinge shaft 135 and allow movement within a certain range. The movable hinge shaft 135 has a release-preventing hanger 134 formed thereon that is traversely disposed with respect to the movable hinge shaft accommodation hole 139, to thereby prevent the movable hinge shaft 135 from slipping through the movable hinge shaft accommodation hole 139.

Further, the fixed hinge 136 has a fixed hinge shaft 137 formed on the second end of the first hinge bracket 140 to allow rotation of the first hinge bracket 140, and a fixed hinge shaft accommodation hole 138 formed in the first sidewall 126 of the frame 125 to support the fixed hinge shaft 137.

The second holder-movable unit 132', for hingedly fixing the second holder 131' to the second sidewall 126', has the same structure as the first holder-movable unit 132, except that the second holder-movable unit 132' is mounted with respect to the second holder 131' on the left end of the contact image sensor 123 at the second sidewall 126'.

As described above, the first and second holder-movable units 132 and 132' of the respective contact image sensor fixing devices 130 and 130' freely move or displace the first and second holders 131 and 131' against the elastic force of the first and second elastic springs 145 and 145', the force being applied to the contact image sensor 123 through the movable hinges 133 and 133' and the fixed hinges 136 and 136', so that pressure is evenly applied between the left and right ends of the white roller 119 and the contact image sensor 123, even when the rotation force of the white roller 119 is applied to the contact image sensor 123.

Even though machining and assembling errors occur in the degree of flatness of the scan glass face of the contact image sensor 123, the degree of position precision of the movable hinge shafts 135 and 135' of the first and second holders 131 and 131', the degree of precision of the fixed hinge shaft accommodation holes 138 and 138' of the first and second sidewalls 126 and 126' of the frame 125, and so on, the contact image sensor fixing devices 130 and 130' are not affected by the errors. This is because the movable hinge shafts 135 and 135' of the first and second holders 131 and 131' freely rotate in the forward and backward directions, and also move in the upward and downward directions within the movable hinge shaft accommodation holes 139 and 139'. Also, the movable hinge shafts are rotatably displaced with respect to the fixed hinge shafts 137 and 137' of the first and second holder-movable units 132 and 132', which are separately formed from the first and second holders 131 and 131'. Accordingly, the contact image sensor fixing devices 130 and 130' of the present invention are not affected by the machining and assembling errors, and maintain even left and right pressures of the contact image sensor 123 and the white roller 119.

The operations of the contact image sensor fixing devices 130 and 130' are described below with reference to FIG. 4 and FIG. 5.

When a document D is transported toward the scanner 18 by the supply roller 14' (as shown in FIG. 1), the document D contacts the scan glass face of the contact image sensor 123 by a rotation force f of the white roller 119.

The rotation force f of the white roller 119 applied to the document D is split into forces f1 and f2 on the left and right sides of the white roller 119, as shown in FIG. 4, which are applied to the scan glass face of the contact image sensor 123 against the force of the first and second elastic springs 145 and 145'.

When the forces f1 and f2 are exerted on the scan glass face of the contact image sensor 123, the left and right ends of the contact image sensor 123 can be freely rotated in the forward and backward directions and moved in the upward and downward directions, respectively, within a range of the movable hinge shaft accommodation holes 139 and 139' by the movable hinge shafts 135 and 135' of the first and second holders 131 and 131', so that the left and right ends of the contact image sensor 123 do not produce unbalanced forces in the forward, backward, upward, and downward directions. Accordingly, the contact image sensor 123 uniformly contacts the surface of the white roller 119 at all times.

Even though the forces f1 and f2 may individually or both be initially applied beyond the movable range of the movable hinge shaft accommodation holes 139 and 139' of the movable hinge shafts 135 and 135', the left and right ends of the contact image sensor 123 evenly contact the surfaces of the left and right ends of the white roller 119 without producing an unbalanced force. This is because the movable hinge shafts 135 and 135' of the first and second holders 131 and 131' may be rotatably displaced by movement of the fixed hinge shafts 137 and 137' of the first and second holder-movable units 132 and 132'.

After the contact image sensor 123 completes the reading of the data of the document D while maintaining even contact pressure and readout position with respect to the white roller 119, the document D is externally discharged by the discharge part 21 (FIG. 1) of the machine.

As described above, the contact image sensor fixing devices 130 and 130' of the present invention have the holder-movable units 132 and 132' for the holders 131 and 131' to be freely displaced against the elastic forces of the elastic springs 145 and 145' applied to the contact image sensor 123. Thus, the present invention provides a steady readout position while maintaining an even contact force between the contact image sensor 123 and the white roller 119.

Although an embodiment of the present invention has been shown and described, it will be appreciated by those skilled in the art that changes may be made in this embodiment without departing from the principles and spirit of the invention, the scope of which is defined in the appended claims and their equivalents.

What is claimed is:

1. A contact image sensor fixing device having a frame, a contact image sensor, and a white roller, the contact image sensor fixing device comprising:
   an elastic unit mounted on the frame to provide an elastic force to push the contact image sensor against the white roller with a pressure, the contact image sensor reading data from a document as the document passes between the contact image sensor and the white roller;
   a holder unit to accommodate and support the contact image sensor; and
   at least one holder-movable unit hinge-connected to the frame and freely moving the holder unit against the elastic force of the elastic unit applied to the contact image sensor to maintain an even pressure between the white roller and the contact image sensor when the contact image sensor receives a rotation force of the white roller,
   wherein the at least one holder-movable unit comprises:
   a hinge bracket;
   a movable hinge formed on one end of the hinge bracket and a corresponding portion of the holder unit to movably support the holder unit within a certain range when the holder unit is elastically displaced by the elastic unit; and
   a fixed hinge formed on another end of the hinge bracket and a corresponding portion of the frame to hingedly attach the other end of the hinge bracket to the frame to enable the holder unit supported by the movable hinge to rotate beyond a moving range of the movable hinge.

2. The contact image sensor fixing device as claimed in claim 1, wherein the movable hinge comprises:
   a movable hinge shaft to freely move the holder unit; and
   a movable hinge shaft accommodation hole supporting the movable hinge shaft within a certain range.

3. The contact image sensor fixing device as claimed in claim 2, wherein the fixed hinge comprises:
   a fixed hinge shaft to rotate the hinge bracket; and
   a fixed hinge shaft accommodation hole supporting the fixed hinge shaft.

4. The contact image sensor fixing device as claimed in claim 3, wherein the holder unit comprises two holders, each holder accommodating an end of the contact image sensor, respectively, and having a corresponding holder-movable unit.

5. The contact image sensor fixing device as claimed in claim 4, wherein each of the holders has a hook member and each end of the contact image sensor has a hook member accommodation groove, and each of the holders is attached to a respective end of the contact image sensor, each hook member accommodation groove receiving a respective hook member.

6. The contact image sensor fixing device as claimed in claim 4, wherein the elastic unit comprises a first spring and a second spring spaced apart from the first spring to elastically support the contact image sensor and evenly push the contact image sensor against the white roller.

7. The contact image sensor fixing device as claimed in claim 2, wherein the movable hinge shaft has a release-preventing hanger formed at an end thereof that is traversely disposed with respect to the movable hinge shaft accommodation hole to prevent the movable hinge shaft from slipping out of the movable hinge shaft accommodation hole.

8. A machine for scanning a document, comprising:
   a frame;
   a white roller; and
   a scanner adjacent to the white roller, the scanner comprising,
      a contact image sensor to read data from the document as the document is conveyed between the contact image sensor and the white roller, and
      a contact image sensor fixing device to attach the contact image sensor to the machine, the contact image sensor fixing device comprising,
         an elastic unit mounted on the frame to push the contact image sensor against the white roller,
         a holder unit to accommodate and support the contact image sensor, and
         at least one holder-movable unit hinge connected to the frame and providing free movement of the holder unit against an elastic force of the elastic unit that is applied to the contact image sensor, the free movement maintaining an even pressure between the white roller and the contact image sensor when a rotation force of the white roller is applied to the contact image sensor, wherein the at least one holder-movable unit comprises:

a hinge bracket having a fan shape with a narrow end and a wide end;

a movable hinge formed on the wide end of the hinge bracket and a corresponding portion of the adjacent holder unit to movably support the holder unit within a certain range when the holder unit is elastically displaced by the elastic unit; and a fixed hinge formed on the narrow end of the hinge bracket and a corresponding portion of the adjacent frame to hingedly attach the narrow end of the hinge bracket to the frame, enabling the holder unit supported by the movable hinge to rotate beyond a moving range of the movable hinge.

9. The machine as claimed in claim 8, wherein the movable hinge comprises:

a movable hinge shaft providing free movement of the holder unit; and a movable hinge shaft accommodation hole supporting the movable hinge shaft within a certain range.

10. The machine as claimed in claim 9, wherein the fixed hinge comprises:

a fixed hinge shaft to rotate the hinge bracket; and a fixed hinge shaft accommodation hole to support the fixed hinge shaft.

11. The machine as claimed in claim 10, wherein the holder unit comprises two holders, each holder accommodating a respective end of the contact image sensor and interfacing with a respective holder-movable unit through the movable hinge.

12. The machine as claimed in claim 11, wherein each of the holders has a hook member and each end of the contact image sensor has a hook member accommodation groove, and each of the holders is attached to a respective end of the contact image sensor by each hook member accommodation groove receiving a respective hook member.

13. The machine as claimed in claim 11, wherein the elastic unit comprises a first spring and a second spring spaced apart from the first spring to elastically support the contact image sensor and evenly push the contact image sensor against the white roller.

14. The machine as claimed in claim 9, wherein the movable hinge shaft has a release-preventing hanger formed at an end thereof that is traversely disposed with respect to the movable hinge shaft accommodation hole to prevent the movable hinge shaft from slipping out of the movable hinge shaft accommodation hole.

15. A method of scanning a document by a machine having a frame, a white roller, a scanner adjacent to the white roller, the scanner having a contact image sensor and a contact image sensor fixing device, and the contact image sensor fixing device having an elastic unit mounted on the frame, a holder unit, and at least one holder-movable unit hinge-connected to the frame, the method comprising:

attaching, by the contact image sensor fixing device, the contact image sensor to the machine;

pushing, by the elastic unit, the contact image sensor against the white roller;

accommodating and supporting the contact image sensor by the holder unit;

providing, by the at least one holder-movable unit, free movement of the holder unit against an elastic force of the elastic unit that is applied to the contact image sensor, the free movement maintaining an even pressure between the white roller and the contact image sensor when a rotation force of the white roller is applied to the contact image sensor;

conveying the document between the contact image sensor and the white roller; and reading data, by the contact image sensor, from the document as the document is conveyed, wherein the at least one holder-movable unit comprises:

a hinge bracket;

a movable hinge formed on one end of the hinge bracket and a corresponding portion of the holder unit to movably support the holder unit within a certain range when the holder unit is elastically displaced by the elastic unit; and a fixed hinge formed on another end of the hinge bracket and a corresponding portion of the frame to hingedly attach the other end of the hinge bracket to the frame to enable the holder unit supported by the movable hinge to rotate beyond a moving range of the movable hinge.

* * * * *